(12) United States Patent
Spieker et al.

(10) Patent No.: US 11,919,519 B2
(45) Date of Patent: Mar. 5, 2024

(54) METHOD AND DEVICE FOR OPERATING AN ASSISTANCE SYSTEM OF A VEHICLE, AND A VEHICLE

(71) Applicant: DAIMLER AG, Stuttgart (DE)

(72) Inventors: Andreas Spieker, Stuttgart (DE); Uli Kolbe, Engen (DE); Alexander Heckmann, Radolfzell (DE); Raphael Raudenbusch, Tuningen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 518 days.

(21) Appl. No.: 17/273,527

(22) PCT Filed: Aug. 22, 2019

(86) PCT No.: PCT/EP2019/072452
§ 371 (c)(1),
(2) Date: Mar. 4, 2021

(87) PCT Pub. No.: WO2020/048782
PCT Pub. Date: Mar. 12, 2020

(65) Prior Publication Data
US 2021/0339748 A1    Nov. 4, 2021

(30) Foreign Application Priority Data
Sep. 5, 2018   (DE) ..................... 10 2018 007 022.1

(51) Int. Cl.
*B60W 30/18*   (2012.01)
*B60W 30/095*  (2012.01)

(52) U.S. Cl.
CPC .. *B60W 30/18163* (2013.01); *B60W 30/0956* (2013.01); *B60W 2520/10* (2013.01);
(Continued)

(58) Field of Classification Search
CPC ......... G05D 1/0055; G05D 2201/0213; G05D 1/0257; G05D 1/0088; G05D 1/0223;
(Continued)

(56) References Cited

U.S. PATENT DOCUMENTS 6,125,324 A * 9/2000 Matsuda ............ B60K 31/0083
701/532
6,269,308 B1   7/2001 Kodaka et al.
(Continued)

FOREIGN PATENT DOCUMENTS

DE    102008010667 A1   8/2008
DE    102008062796 A1   6/2010
(Continued)

OTHER PUBLICATIONS

International Search Report dated Nov. 15, 2019 in related/corresponding International Application No. PCT/EP2019/072452.
(Continued)

*Primary Examiner* — Steven B Theriault
(74) *Attorney, Agent, or Firm* — PATENT PORTFOLIO BUILDERS PLLC

(57) ABSTRACT

A method and a device for operating an assistance system of a vehicle involves detecting laterally static and laterally dynamic objects, which the vehicle is to drive past, as lateral boundary objects. A respective lateral distance of the vehicle from the respective lateral boundary object is detected. A speed of the respective laterally dynamic object is determined and at least the respectively laterally dynamic object is classified according to its type. A set of characteristic curves is stored in a control unit of the vehicle, the characteristic curves of the set being assigned in each case to an environmental situation predetermined depending on lateral boundary objects. It is predetermined by a respective characteristic curve for the respective environmental situation at
(Continued)

Figure 1:
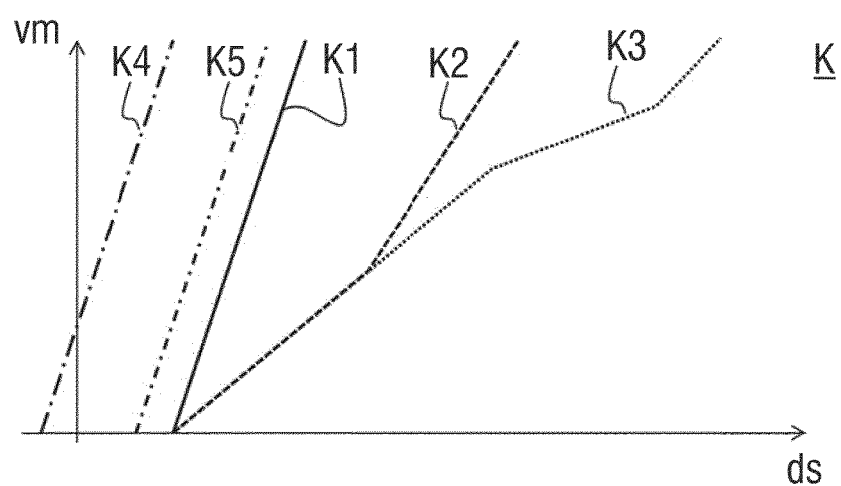

what maximum speed the vehicle is to drive past a lateral boundary object at different lateral distances from the latter.

9 Claims, 3 Drawing Sheets

(52) U.S. Cl.
CPC ..... *B60W 2552/05* (2020.02); *B60W 2552/50* (2020.02); *B60W 2552/53* (2020.02); *B60W 2554/20* (2020.02); *B60W 2554/4026* (2020.02); *B60W 2554/4029* (2020.02); *B60W 2554/4041* (2020.02); *B60W 2554/801* (2020.02)

(58) Field of Classification Search
CPC ............ G05D 1/0212; B60W 2552/53; B60W 2420/52; B60W 2554/4045; G01C 21/3453; G01C 21/3602; G01C 21/3658; G08G 1/166; G08G 1/096725; G08G 1/017
See application file for complete search history.

(56) References Cited

U.S. PATENT DOCUMENTS

| | | | | |
|---|---|---|---|---|
| 6,941,201 | B2* | 9/2005 | Sudou | G05D 1/0289 |
| | | | | 701/41 |
| 8,687,063 | B2* | 4/2014 | Hsieh | G06V 20/588 |
| | | | | 348/148 |
| 9,809,219 | B2* | 11/2017 | Agnew | B60W 60/00274 |
| 10,671,079 | B2* | 6/2020 | Russell | G08G 1/166 |
| 10,698,407 | B2* | 6/2020 | Ostafew | G05D 1/0088 |
| 11,049,396 | B2* | 6/2021 | Hamada | G08G 1/163 |
| 2003/0163239 | A1* | 8/2003 | Winner | B60K 31/0008 |
| | | | | 701/93 |
| 2011/0054689 | A1* | 3/2011 | Nielsen | G05D 1/0214 |
| | | | | 700/258 |
| 2012/0154135 | A1* | 6/2012 | Tronnier | G08G 1/166 |
| | | | | 340/435 |
| 2012/0188374 | A1* | 7/2012 | Taner | B60W 30/18163 |
| | | | | 348/148 |
| 2014/0121880 | A1* | 5/2014 | Dolgov | G01C 21/3407 |
| | | | | 701/1 |
| 2015/0006028 | A1* | 1/2015 | Strauss | B60W 60/0051 |
| | | | | 701/36 |
| 2015/0210279 | A1* | 7/2015 | Agnew | B60W 60/00274 |
| | | | | 701/48 |
| 2017/0003683 | A1* | 1/2017 | Sato | B60W 30/12 |
| 2017/0129501 | A1* | 5/2017 | Lee | B60W 30/18163 |
| 2017/0197618 | A1* | 7/2017 | Ali | G06N 20/00 |
| 2018/0118264 | A1 | 5/2018 | Adiprasito et al. | |
| 2018/0165959 | A1* | 6/2018 | Leem | B60W 30/16 |
| 2018/0267548 | A1* | 9/2018 | Sumioka | G05D 1/0214 |
| 2018/0345956 | A1* | 12/2018 | Ohmura | B60W 30/162 |
| 2018/0370526 | A1* | 12/2018 | Ohmura | G06V 20/584 |
| 2019/0004529 | A1* | 1/2019 | Im | B62D 15/0255 |
| 2019/0121362 | A1* | 4/2019 | Russell | G05D 1/0088 |
| 2019/0217863 | A1* | 7/2019 | Jung | B60W 30/0956 |
| 2019/0250617 | A1* | 8/2019 | Ford | G05D 1/0212 |
| 2020/0012286 | A1* | 1/2020 | Delp | G06V 20/588 |
| 2020/0062244 | A1* | 2/2020 | Iimura | B62D 6/00 |
| 2020/0180618 | A1* | 6/2020 | Ohmura | B60W 60/0015 |

FOREIGN PATENT DOCUMENTS

| | | |
|---|---|---|
| DE | 102010012954 A1 | 9/2011 |
| DE | 102013000310 A1 | 8/2013 |
| EP | 2330009 A1 | 6/2011 |
| EP | 1508819 B2 | 10/2014 |

OTHER PUBLICATIONS

Written Opinion dated Nov. 15, 2019 in related/corresponding International Application No. PCT/EP2019/072452.

* cited by examiner

METHOD AND DEVICE FOR OPERATING AN ASSISTANCE SYSTEM OF A VEHICLE, AND A VEHICLE

BACKGROUND AND SUMMARY OF THE INVENTION

Exemplary embodiments of the invention relate to a method for operating an assistance system of a vehicle. Furthermore, exemplary embodiments of the invention relate to a device for carrying out the method and a vehicle having such a device.

A driver assistance system and a motor vehicle having such a driver assistance system are known from EP 1 508 819 B2. The driver assistance system comprises a radar sensor or a laser sensor for determining a distance between the motor vehicle and an obstacle lying substantially next to the lane, for determining a distance between at least two obstacles in front of the motor vehicle and for determining a speed of the obstacle. Furthermore, the driver assistance system has a driver assistance control for determining a steering angle correction value, for determining a brake correction value, and for outputting distance information depending on the distance between the at least two obstacles in front of the motor vehicle, the distance between the motor vehicle, and the obstacle lying substantially next to the lane and the speed of the obstacle.

In addition, DE 10 2010 012 954 A1 describes a method for operating a driver assistance device of a vehicle located on a roadway and a driver assistance device. The method detects obstacles located on and/or next to the roadway, wherein a lateral distance between the at least two obstacles in front of the vehicle and a speed of at least one of the obstacles are detected. Here, an intrinsic speed of the vehicle is automatically adapted to the speed of the at least one obstacle if the lateral distance between the at least two obstacles falls below a minimum roadway width. The minimum roadway width is determined from a vehicle width of the vehicle and in each case a lateral minimum distance variably and situation-dependently depending on a type of the obstacles, depending on movement courses of the obstacles and/or depending on a current and/or future lane course.

Exemplary embodiments of the invention are directed to a method and device for operating an assistance system of a vehicle, which are improved compared to prior art, and a vehicle.

A method for operating an assistance system of a vehicle provides that laterally static and laterally dynamic objects, which the vehicle is to drive past, are detected as lateral boundary objects. A lateral boundary object is thus understood as an object that can be static or dynamic and which limits a driving corridor, which is available for the vehicle to drive along, laterally, i.e., transversely to the driving direction of the vehicle. The method further provides that a respective lateral distance from the vehicle to the respective lateral boundary object is detected and that a speed of the respectively lateral dynamic object is determined and at least the respective laterally dynamic object is classified according to its type. In accordance with the invention, a set of characteristic curves is stored in a control unit of the vehicle, the characteristic curves of which are each assigned to an environmental situation, wherein by means of a respective characteristic curve for the respective environmental situation, it is predetermined at what maximum speed the vehicle is to drive past a lateral boundary object at different lateral distances from the latter.

The environmental situations relevant for the characteristic curves are specified depending on lateral boundary objects. That means, for different predetermined constellations of lateral boundary objects, one environmental situation is predetermined in each case. An environmental situation is thus determined by the presence or absence of one or more lateral boundary objects and by the properties of the existing lateral boundary objects. These properties thus comprise information about the dynamic condition of the respective boundary object, i.e., information about whether the respective boundary object is a laterally static or laterally dynamic object. In the case of laterally dynamic objects, this information preferably also includes information about the speeds of these objects. These properties preferably include, at least for laterally dynamic objects, information about the type of these objects, e.g., information about whether these objects are vehicles, pedestrians, cyclists, wherein in the case of vehicles, a distinction is preferably made between passenger cars, commercial vehicles and buses.

By applying the method, it is substantially possible to react adequately to stationary and moving obstacles, i.e., to the static and dynamic objects as lateral boundary objects, in particular in the highly automated driving mode of the vehicle. The determined maximum speed and the target position of the vehicle are used in particular for longitudinal and lateral control of the vehicle in a highly automated, i.e., autonomous, driving mode.

Lanes and other roadway boundaries, such as crash barriers or tunnel walls, are taken into account.

In particular, depending on the traffic situation, a displacement of the vehicle in its lane or even a crossing of a lane marking and/or the observance of a maximum speed or maximum differential speed is/are required.

By means of this method, in comparatively many traffic situations, in which in addition to normal traffic, a conspicuous or dangerous obstacle, e.g., another vehicle that has stopped, is present, a reasonable displacement of the vehicle and/or a target speed, i.e., the maximum speed, can be determined in a relatively simple way without the need to apply a complex optimization method. Thereby, a saving of computing time can be achieved.

When using more complex optimization methods, in particular optimization algorithms, a correlation between specification of optimization criteria and an expected result is less obvious than with the method according to the invention.

With a certification of the highly automated driving operation, an expected behavior of the assistance system in the different traffic situations can be presented in a relatively understandable and comprehensible way.

In one embodiment, characteristic curves are selected according to the current environmental situation on a left lane side and on a right lane side and a determination of the target speed and a lateral target position of the vehicle between two lateral boundary objects is based on these characteristics. The characteristic curve of a left lane side is selected according to the environmental situation affecting this lane side and the characteristic curve of the right lane side is selected according to the environmental situation on a right lane side, such that the characteristic curves reflect actual environmental situations on which the determination of the target speed, i.e., the maximum speed, and the lateral target position is based. Thus, a potential danger for the vehicle or the dynamic object due to a characteristic curve not corresponding to the environmental situation can be excluded as far as possible.

A further embodiment of the method provides that the maximum speed varies depending on the lateral boundary object. It is thus possible, for example, that the predetermined maximum speed at which the vehicle drives past the lateral boundary object is higher for a static object than for a dynamic object, in particular for an unprotected road user.

In a development of the method, the characteristic curve corresponding to the environmental situation on each side of the lane is converted into the recommended maximum speed based on a speed of the respective lateral boundary object. This means that the speed of the lateral boundary object is also taken into account when determining the maximum speed. Thus, the maximum speed of a static object can be selected to be higher than if it is a dynamic object, in particular a pedestrian.

In order to determine both the maximum speed and the respective lateral target distance of the vehicle with respect to lateral boundary objects, the characteristic curves corresponding to the environmental situation on each lane side are added to an overall characteristic curve. Thus, an overall characteristic curve is generated, which is the basis for controlling the assistance system.

To determine the maximum speed, a free width for the vehicle remaining between a lateral boundary object on the left side of the lane and a lateral boundary object on the right side of the lane is determined. By means of the remaining width, which is also referred to as free usable width, the maximum speed is determined from the overall characteristic curve.

In a possible development, further vehicles, pedestrians and (motor)cyclists will be detected as dynamic objects, wherein in particular the dynamic objects are classified after being detected.

As static objects, however, lane markings, crash barriers, tunnel walls and bridge pillars are detected as lateral boundary objects.

Furthermore, the invention relates to a device for carrying out a method. A set of characteristic curves is stored in a control unit of the vehicle, wherein the characteristic curves are assigned to a respective environmental situation, wherein the maximum speed at which the vehicle is to drive past the detected lateral boundary objects at different distances from them can be predetermined by means of the respective characteristic curve.

In addition, the invention relates to a vehicle having such a device.

Exemplary embodiments of the invention are explained in more detail below using drawings.

BRIEF DESCRIPTION OF THE DRAWING FIGURES

Figure 2:
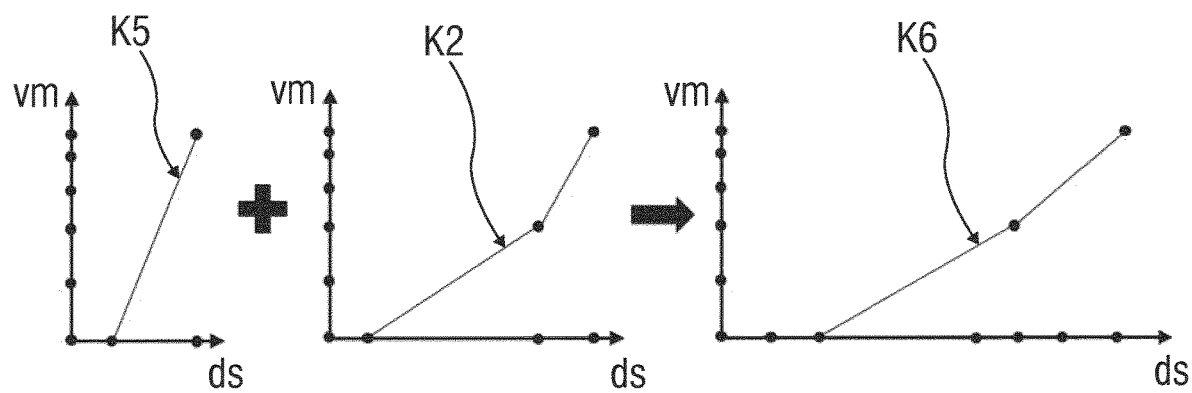
Figure 3:
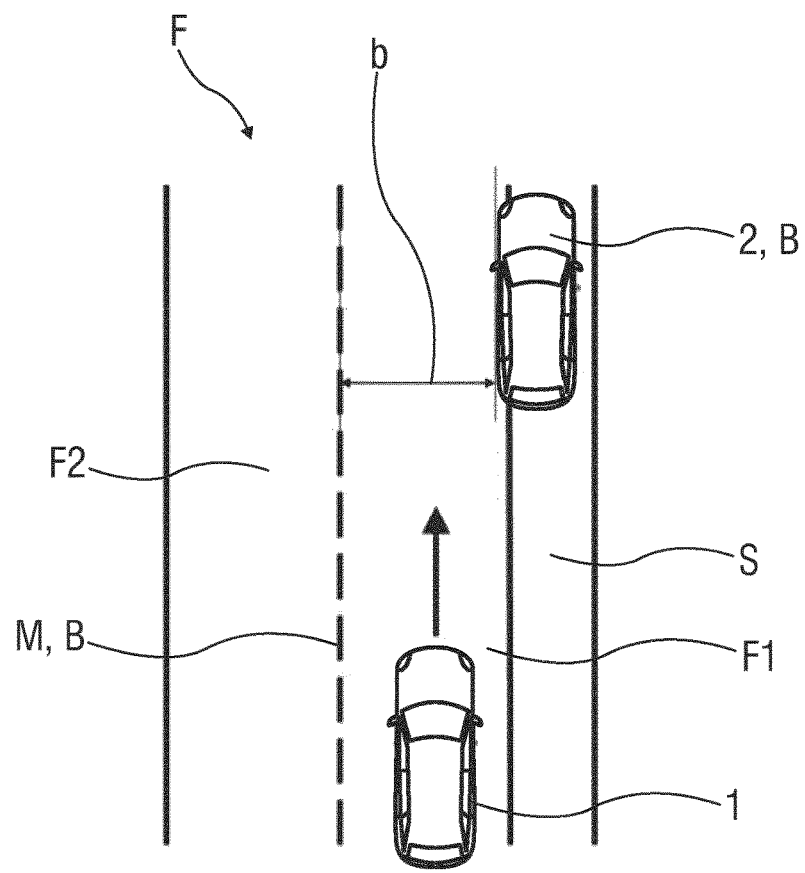
Figure 4:
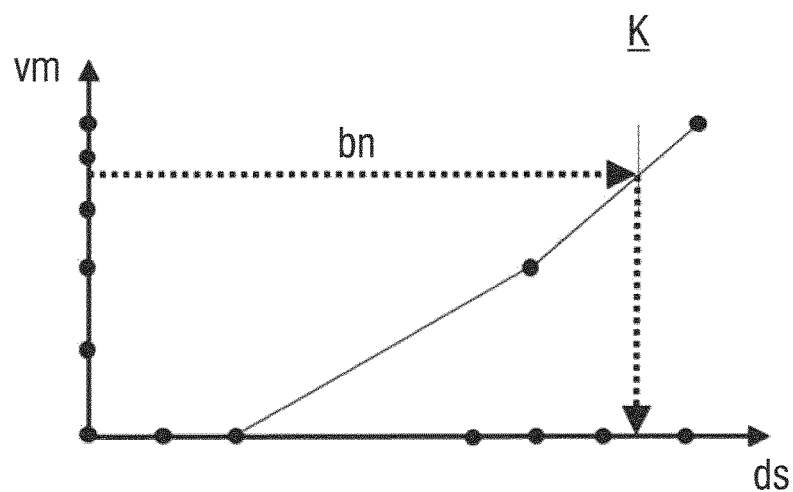
Figure 5:
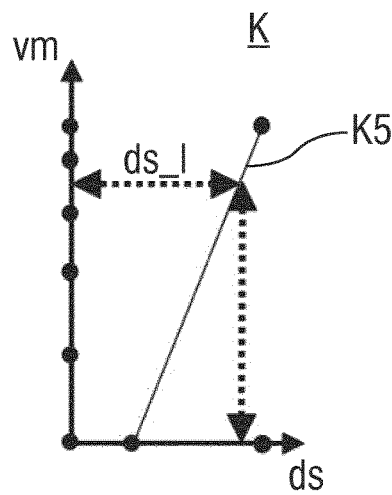
Figure 6:
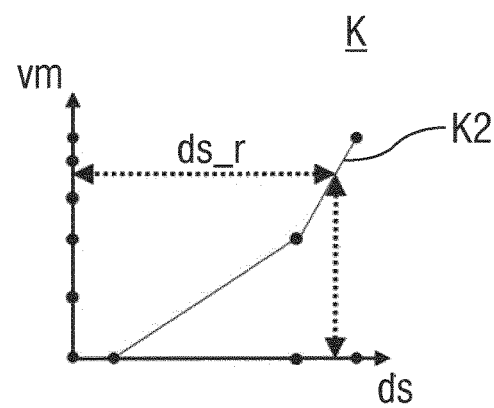
Figure 7:
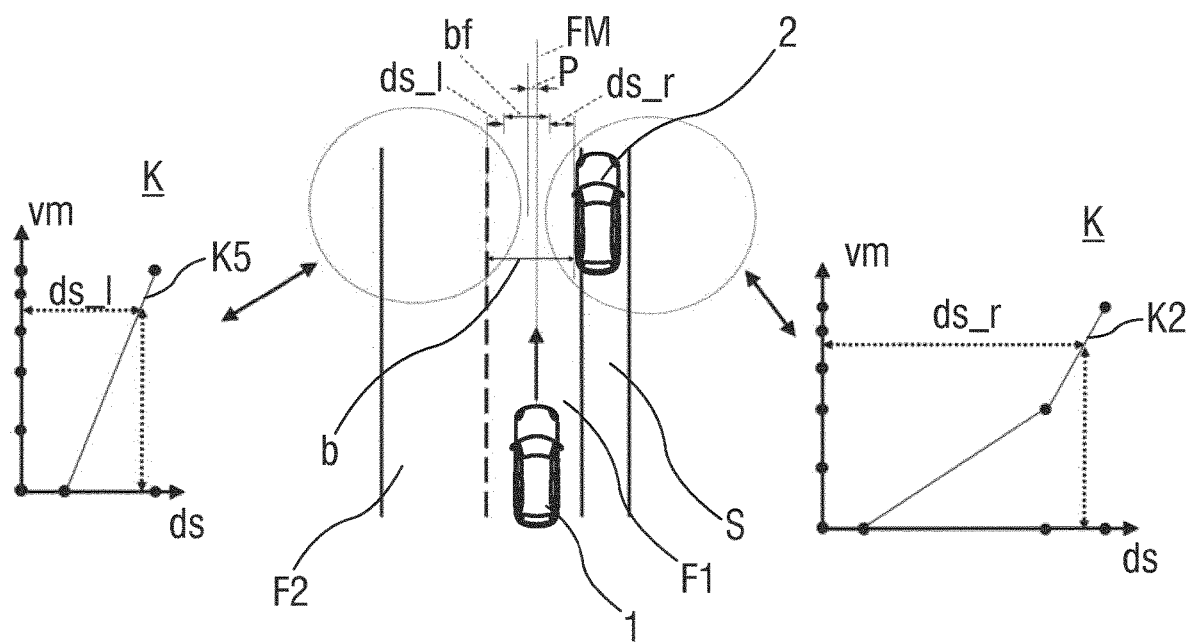

Here are shown:

FIG. 1 schematically, a coordinate system having a set of characteristic curves, FIG. 2 schematically, two characteristic curves and an overall characteristic curve, FIG. 3 schematically, a vehicle, a free usable width for the vehicle and a further vehicle on a section of road, FIG. 4 schematically, a coordinate system having a maximum speed determined by means of the overall characteristic curve, FIG. 5 schematically, a coordinate system for determining a left target distance, FIG. 6 schematically, a coordinate system for determining a right target distance and FIG. 7 schematically, the section of road according to FIG. 3 and the two coordinate systems according to FIGS. 5 and 6.

Parts corresponding to one another are provided with the same reference numerals in all figures.

DETAILED DESCRIPTION

FIG. 1 shows a coordinate system K having a so-called characteristic curve set consisting of five characteristic curves K1 to K5.

Each of the characteristic curves K1 to K5 represents an environmental situation for a vehicle 1 depicted in more detail in FIG. 3 on a road section F.

In particular in the highly automated driving mode of the vehicle 1, it is necessary to determine a target speed vm of the vehicle 1, hereinafter referred to as maximum speed vm, and a lateral target position, a so-called transverse position, of the vehicle 1, depending on or alongside a lane F1 of the vehicle 1 shown in FIG. 3.

To determine the maximum speed vm and the lateral target position for the vehicle 1, a method described below is provided.

For this purpose, the environmental situation of the vehicle 1 is detected, in particular by means of detection units of an environmental sensor system of the vehicle 1, by means of a vehicle-to-infrastructure communication, and/or by means of other suitable means and information.

The environmental situation is determined by static objects and/or dynamic objects as lateral boundary objects B, wherein boundary objects B are depicted by way of example in FIG. 3.

Crash barriers, tunnel walls, bridge pillars, lane markings M depicted in FIG. 3 are, inter alia, detected as static objects, wherein a further vehicle 2 shown in FIG. 3, pedestrians, cyclists are, inter alia, detected as dynamic objects.

In the vehicle 1, the set of characteristic curves is stored and predetermined in a control unit, wherein each characteristic curve K1 to K5 is assigned to an environmental situation, i.e., represents an environmental situation. By way of example, the control unit is a component of an assistance system for highly automated, i.e., autonomous, driving operation of the vehicle 1.

A respective characteristic curve K1 to K5 predetermines a recommended maximum speed vm and a lateral distance ds between the vehicle 1 and the detected static object and/or dynamic object determining the environmental situation, i.e., to the lateral boundary object B, for the respective environmental situation.

According to the coordinate system K in FIG. 1, the maximum speed vm is plotted on the ordinate and the lateral distance ds on the abscissa.

The maximum speed vm, which serves as a recommendation for driving past the detected lateral boundary object B, depends on the lateral distance ds, and represents a driving speed for the vehicle 1 at which the vehicle 1 is to drive past the respective lateral boundary object B at different possible lateral distances ds, in particular in the highly automated driving mode.

Moreover, the maximum speed vm represents an absolute or even relative driving speed of the vehicle 1 depending on the detected environmental situation and depending on whether the detected lateral boundary object B is a static object or a dynamic object.

In the case of a dynamic object as a lateral boundary object B, it is advantageous to initially predetermine the corresponding characteristic curve K1 to K5 in such a way that it represents a relative maximum speed vm related to the respective dynamic object. These characteristic curves K1 to K5 are then converted into the recommended absolute maximum speed vm based on a current speed of the detected dynamic object, in the following also called speed of movement.

To determine the maximum speed vm and the lateral target position of the vehicle 1, which is also dependent on the lateral distances ds, a characteristic curve K1 to K5 corresponding to the detected environmental situation is selected for both a left lane side and a right lane side.

By way of example, a first characteristic curve K1 is selected if a crash barrier is located next to the lane F1 of the vehicle 1 as a static object and thus as a lateral boundary object B.

A second characteristic curve K2 is selected, for example, if another vehicle 2 is located next to the lane F1 of the vehicle 1 as a lateral boundary object B.

If a pedestrian or a (motor)cyclist is located next to the lane F1 of the vehicle 1 as a lateral boundary object B, a third characteristic curve K3 is selected and used as the basis for a control of the vehicle 1.

A fourth characteristic curve K4 is then selected if the lane F1 of the vehicle 1 is an outer one whose lateral area, for example a hard shoulder S shown in FIG. 3, can be driven on. In such a case, the lane marking M represents the static object, i.e., the lateral boundary object B. The lateral distance ds refers to a lateral distance between the vehicle 1 and the lane marking M, wherein a negative lateral distance ds indicates that an area outside the lane F1 can or is allowed to be driven on.

In the case that there is a free lane F2 next to the lane F1 of the vehicle 1, the lane marking M also represents a static object as a lateral boundary object B and a fifth characteristic curve K5 is selected.

From the set of characteristic curves, the fifth characteristic curve K5 corresponding to the detected environmental situation is then selected for the left side of the lane and the second characteristic curve K2 corresponding to the environmental situation is selected for the right side of the lane, in accordance with the exemplary embodiment in FIG. 3.

The fifth characteristic curve K5 and the second characteristic curve K2 are then added in the direction of the ordinate to form a total characteristic curve K6, as shown in FIG. 2. For a possible combination, this can be determined in advance on the vehicle side at absolute movement speeds.

Subsequently, a remaining width b, i.e., a distance between the detected lateral boundary object B on the left lane side, namely the lane marking M, and the detected lateral boundary object B on the right lane side, namely the further vehicle 2, is determined at the height of the respective lateral boundary object B. From the remaining width b, a free usable width bn depicted in FIG. 4 is determined, which is determined using the remaining width b minus a vehicle width bf shown in FIG. 7.

By means of the free usable width bn, the maximum speed vm can then be determined from the overall characteristic curve K6, as shown in FIG. 4.

Using the determined maximum speed vm, a lateral target distance ds_l shown in FIG. 5 in the direction of the left side of the lane and a lateral target distance ds_r in the direction of the right side of the lane shown in FIG. 6 can then be determined from the two selected characteristic curves K5, K2.

The two lateral target distances ds_l, ds_r generally do not lead to a central positioning of the vehicle 1 between the detected lateral boundary objects B, i.e., the free usable width bn.

An actual lateral target position P of the vehicle 1 shown in FIG. 7 can be predetermined by means of a distance of the vehicle 1 starting from its center to the center of the lane FM or as a distance to another reference line, e.g., to the lane marking M of the lane F1 of the vehicle 1.

FIG. 7 shows an overview of the application of the method with the road section F according to FIG. 3 and the two coordinate systems K according to FIGS. 5 and 6.

In a possible embodiment of the method, it is provided that objects alongside the lane F1 are classified, wherein a respective characteristic curve K1 to K5 is predetermined for each object class, for example passenger cars, lorries.

Furthermore, it is conceivable to predetermine different characteristic curves K1 to K5 for different operating states of the vehicle 1. By way of example, for a vehicle 1, which comprises an assistance system for automated driving, a distinction can be made between automated driving and manual driving.

Alternatively, or additionally, it can be provided that a parameterization of the characteristic curves K1 to K5 is carried out depending on a prevailing general traffic situation, e.g., congestion/free-flowing traffic, motorway/urban motorway/country road/other road, wherein a characteristic curve K1 to K5 is predetermined for each of these traffic situations.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for a vehicle, the method comprising:
   detecting, laterally static and laterally dynamic objects, which the vehicle is to drive past, as lateral boundary objects;
   detecting a respective lateral distance of the vehicle from each detected lateral boundary objects;
   determining a speed of the detected lateral boundary objects;
   classifying, at least the detected laterally dynamic objects, according to a type of laterally dynamic object; and
   controlling the vehicle based on a characteristic curve selected from a set of characteristic curves stored in the vehicle,
   wherein each characteristic curve of the set of characteristic curves is assigned to an environmental situation predetermined depending on detected lateral boundary objects, wherein each characteristic curve of the set of characteristic curves predetermines a maximum speed the vehicle is to drive past the detected boundary object at different lateral distances from the detected boundary object, wherein characteristic curves of the set of characteristic curves for a current environmental situation on a left lane side and on a right lane side of the vehicle are selected, and a maximum speed and a lateral target position of the vehicle between two lateral boundary objects is controlled based on the selected characteristic curves, and wherein the selected characteristic curves corresponding to the environmental situation on the left and right lane sides are added to form an overall characteristic curve that is used to control the vehicle.

2. The method of claim 1, wherein the maximum speed varies depending on the detected lateral boundary object.

3. The method of claim 1, wherein the selected characteristic curves corresponding to the environmental situation on the left and right lane sides is converted into a recommended maximum speed based on a movement speed of the respective lateral boundary object.

4. The method of claim 1, wherein the determination of the maximum speed comprises determining a free width remaining between a lateral boundary object on the left lane side and the vehicle and between a lateral boundary object on the right lane side of the vehicle.

5. The method of claim 1, wherein the laterally dynamic objects include further vehicles, pedestrians, motorcyclists, and cyclists.

6. The method of claim 1, wherein the laterally static objects include lane markings, crash barriers, tunnel walls, and bridge pillars.

7. A method for a vehicle, the method comprising:

detecting, laterally static and laterally dynamic objects, which the vehicle is to drive past, as lateral boundary objects;

detecting a respective lateral distance of the vehicle from each detected lateral boundary objects;

determining a speed of the detected lateral boundary objects;

classifying, at least the detected laterally dynamic objects, according to a type of laterally dynamic object;

selecting a first characteristic curve from a set of characteristic curves based on an environmental situation predetermined depending on detected lateral boundary objects on a left lane side of the vehicle;

selecting a second characteristic curve from the set of characteristic curves based on an environmental situation predetermined depending on detected lateral boundary objects on a right lane side of the vehicle;

adding the first and second characteristic curves in an ordinate direction to form a third characteristic curve;

determining a distance between the vehicle and the detected lateral boundary objects on the left and right lane sides of the vehicle;

determining a maximum speed of the vehicle to drive past the detected boundary objects on the left and right lane sides of the vehicle based on the determined distance; and controlling the vehicle using the determined maximum speed as the vehicle drives past the detected boundary objects on the left and right lane sides of the vehicle.

8. The method of claim 7, wherein the laterally dynamic objects include further vehicles, pedestrians, motorcyclists, and cyclists.

9. The method of claim 1, wherein the laterally static objects include lane markings, crash barriers, tunnel walls, and bridge pillars.

* * * * *

UNITED STATES PATENT AND TRADEMARK OFFICE
CERTIFICATE OF CORRECTION

PATENT NO. : 11,919,519 B2
APPLICATION NO. : 16/868272
DATED : February 20, 2024
INVENTOR(S) : Gerd Kilian et al.

It is certified that error appears in the above-identified patent and that said Letters Patent is hereby corrected as shown below:

On the Title Page

Item (72) Inventors:
Delete "Raimund Meyer, Erlangen (DE);" and insert -- Raimund Meyer, Fuerth (DE); --
Delete "Frank Obernosterer, Fuerth (DE);" and insert -- Frank Obernosterer, Nuernberg (DE); --

Signed and Sealed this
Twenty-fourth Day of September, 2024

Katherine Kelly Vidal
*Director of the United States Patent and Trademark Office*